May 7, 1940.  J. M. MARTY  2,199,504
APPARATUS FOR FOOD PREPARATION
Filed July 1, 1937  2 Sheets-Sheet 1
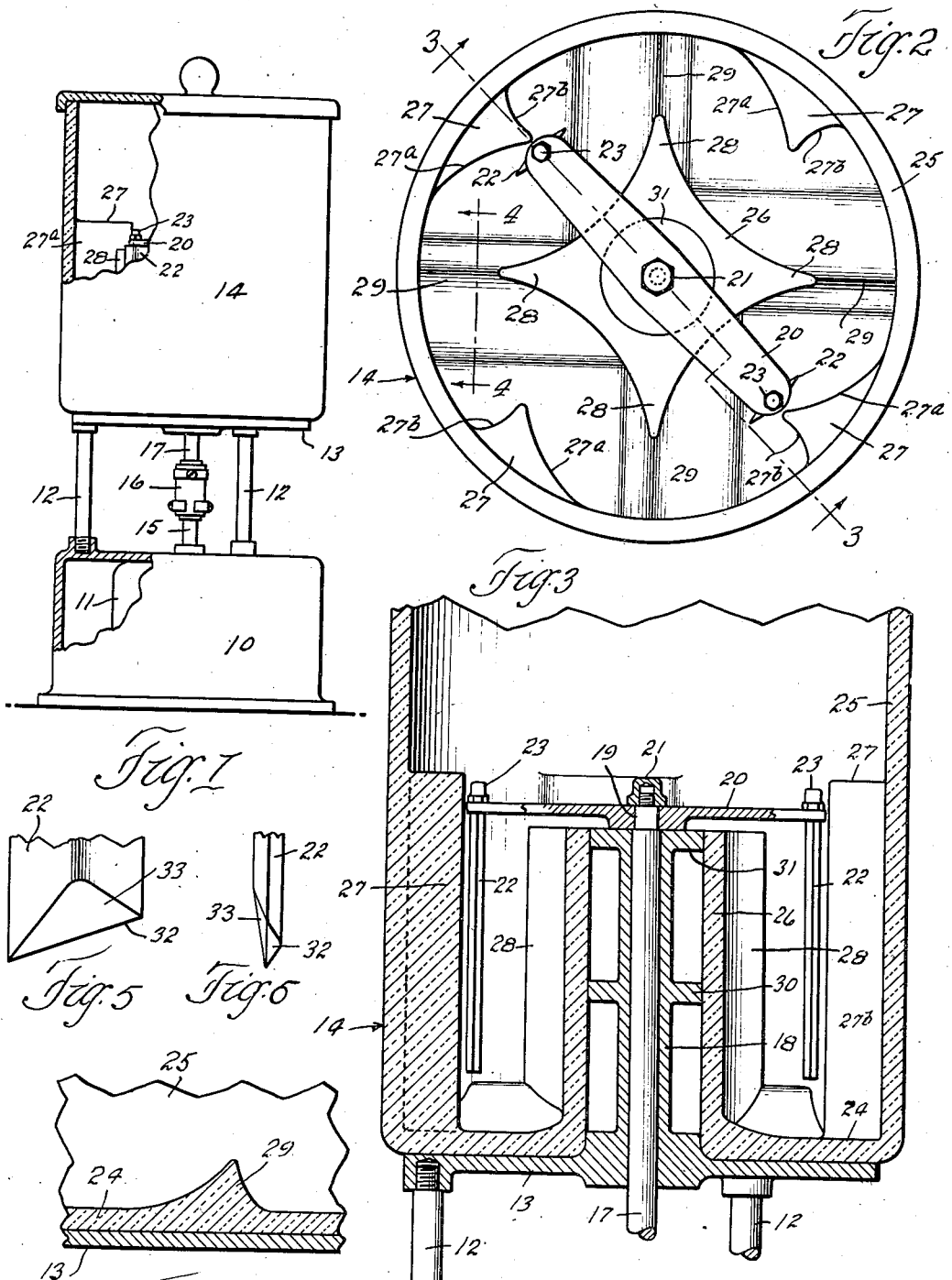
INVENTOR.
J. M. Marty
BY
ATTORNEY.

May 7, 1940.　　　　J. M. MARTY　　　　2,199,504
APPARATUS FOR FOOD PREPARATION
Filed July 1, 1937　　　2 Sheets-Sheet 2
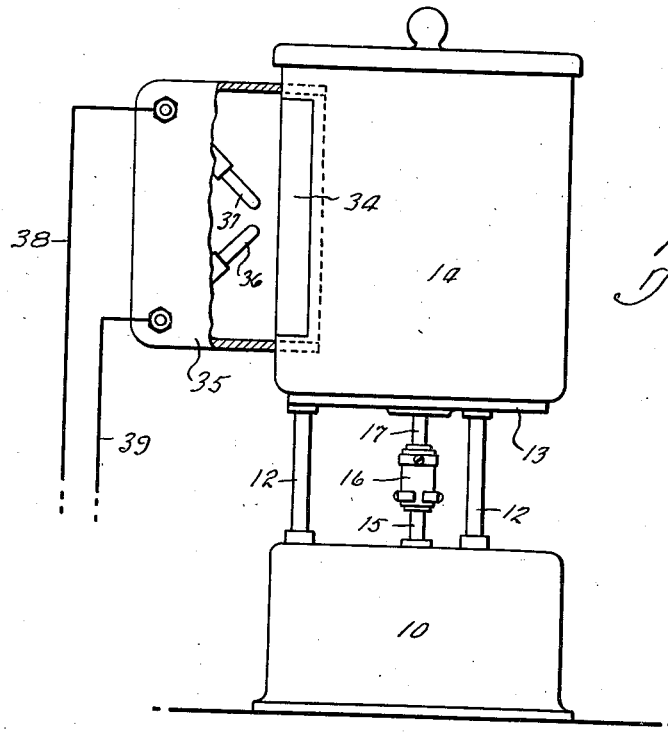
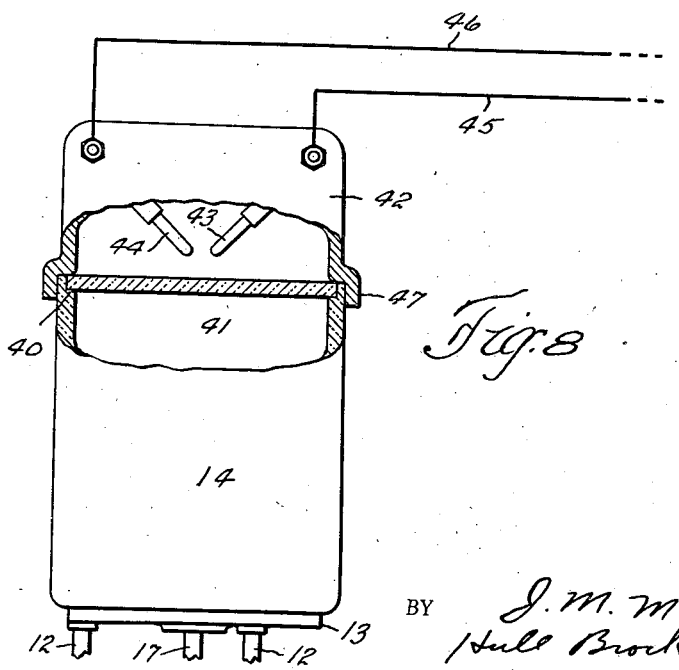
INVENTOR.
BY J. M. Marty
Hull Brock & West
ATTORNEY.

Patented May 7, 1940

2,199,504

UNITED STATES PATENT OFFICE 2,199,504

APPARATUS FOR FOOD PREPARATION

John M. Marty, Parma, Ohio

Application July 1, 1937, Serial No. 151,435

6 Claims. (Cl. 146—68)

This invention relates to food preparation and particularly to the reduction of foods such as vegetables, fruits and the like to semi-liquid state by a cutting operation while suspended in liquid or semi-liquid medium.

An object of the invention is to provide an improved device for the above stated purpose, more specifically the combination of a receptacle having inner and outer walls upstanding from an annular bottom wall whereby to define a generally annular space therebetween in combination with cutting means extending into such annular space and rotatable substantially concentrically thereto.

A further object is to provide a novel method of food preparation whereby vegetables and the like may be reduced to semi-liquid form by the above indicated cutting operation without the addition of substantial amounts of liquids other than those derived from the food materials themselves. A further object is to provide for treatment of the food substance with ultra-violet or similar rays simultaneously with its reduction to liquid or semi-liquid condition.

Other and more specific objects will be in part apparent and in part pointed out hereinafter in connection with the accompanying drawings wherein Fig. 1 is an elevation of a device embodying my invention; Fig. 2 is a plan view of the device shown in Fig. 1 with the cover removed; Fig. 3 is a fragmentary vertical section corresponding substantially to the line 3—3 of Fig. 2; Fig. 4 is a fragmentary section corresponding substantially to the line 4—4 of Fig. 2; Figs. 5 and 6 are fragmentary side and edge views respectively of a modified form of cutting element; Fig. 7 is a diagrammatic view showing a form similar to that shown in Fig. 1 but modified to provide for irradiation by ultra-violet light through a window in the side of the receptacle and Fig. 8 is a diagrammatic view showing a provision for irradiation from the top of the receptacle.

In the drawings the numeral 10 indicates a hollow base element within which may be housed an electric motor 11 and to the top of which are secured supporting posts 12 for a receptacle support 13 upon which may rest the receptacle 14. Connected to the armature shaft 15 of the motor 11 by means of a universal joint 16 is a shaft 17 which extends through the receptacle support 13 and a sleeve 18 extending upwardly therefrom. The shaft 17 is squared at its upper end as indicated at 19 and receives thereon a transversely extending element or cross member 20 held in place by a suitable nut 21. Carried by the ends of the element 20 and depending therefrom are cutting elements 22 which are rotatably adjustably attached by means of extensions extending through the element 20 and secured thereto by nuts 23. From Fig. 2 it will be apparent that the elements 22 are sharpened at both edges whereby they may be reversed or the direction of rotation of the motor may be reversed. This shape also provides streamlining and at the same time assists in agitating the mixture within the receptacle. The element 20 together with the cutting elements 22 constitutes a U-shaped rotatable element which although made up in a plurality of parts may if desired be integral. As will be obvious from the drawings, the receptacle 14 is made up of an annular bottom wall 24 and integral upstanding outer and inner walls 25 and 26 defining therebetween an annular food receiving space in which the cutting elements 22 rotate. Projecting inwardly from the wall 25 are baffles 27 which preferably are generally triangular in cross section and provided with concave faces 27ª and 27ᵇ for agitating the mixture in the receptacle. The inner wall 26 is shaped to present similar baffles 28 projecting outwardly from the inner wall 26. The baffles preferably are integral with the inner and outer walls but may be separate and adjustable. Projecting upwardly from the bottom wall 24 are baffles 29 similar in cross section to those 27. Preferably the baffles 27 and 29 have their longer faces extending in the direction of motion of the cutting elements since they promote agitation somewhat more efficiently if so arranged. It is to be understood, however, that the cutting elements may be rotated in the opposite direction with good results. The receptacle preferably extends some distance above the element 20 and it is a matter of choice whether the material being treated is present in an amount sufficient to extend above the cutting mechanism. The power required is somewhat less if the liquid level is below the element 20 and in this case the possibility of leakage downwardly around the shaft 17 is removed although I prefer that the joint between the central portion of the element 20 and the sleeve 18 shall be of such construction as to constitute a seal against such leakage. The sleeve 18 is provided with collars 30 and 31 adapted to position the receptacle 14 accurately so that the radial clearance between the cutting elements 22 and the baffles 27 and 28 need not be great. It is to be understood that the baffles cooperate with the cutting elements to produce agitation and a slow rotation of the liquid with the cutting elements.

As above stated the cross sectional shape of the cutting elements 22 is such as to promote agitation and if desired the lower ends of these elements may have the configuration shown in Figs. 5 and 6 whereby to cooperate with the bottom baffles 29 to prevent any material remaining long below the tops of the baffles 29. While the construction of this modified form of cutting element is apparent from Figs. 5 and 6, it may be stated that one half of the blade is provided with a surface 32 which will produce a downward force on the liquid and that the other half is provided with a surface 33 which will impart a radial and downward motion.

In Fig. 7 I have indicated how the device above described may be modified for the purpose of ultra-violet irradiation by providing a fused quartz window 34 in the receptacle 14 adjacent which may be positioned any ultra-violet light generator 35 such as a carbon arc lamp having electrodes 36 and 37 and supplied by a suitable current through the conductors 38 and 39.

It is highly advantageous to irradiate the material while it is being reduced to semi-liquid form since the final product is not very transparent to ultra-violet light and the repeated exposure which results from the agitation provides more efficient irradiation than would be the case if the final material were irradiated in a quiescent state. Furthermore the time required for final preparation is much reduced.

In Fig. 8 I have shown a different modification for ultra-violet irradiation comprising the provision of a shoulder 40 at the upper edge of the receptacle 14 for supporting a fused quartz plate 41 and substituting the ultra-violet generator 42 for the cover shown in Fig. 1. In this case it is not necessary to provide a window in the receptacle and the ultra-violet generator such as a carbon arc lamp having electrodes 43 and 44 and supplied by conductors 45 and 46 can be conveniently supported by resting on top of the receptacle and being held in proper position thereon by a flange 47.

In the preparation of foods by the use of this machine it is necessary that the food masses to be disintegrated be suspended in a liquid or semi-liquid medium. It is likewise desirable in many cases to avoid the use of added water or other foreign liquid, that is, to be able to prepare the liquid or semi-liquid food product from the food substance itself without the addition of water or other foreign liquid. This result may be accomplished by using a portion of a previously prepared batch of the same substance as a suspending medium, the original batch being suspended either in water or in a quantity of the food substance liquefied by other means. In case water is initially used as a suspending medium, it will be present in only a small degree after the process has been repeated a few times so that after a reasonable number of batches has been made, the product will be substantially free from added water. This process will in most cases not be available for domestic use but in the case of restaurants and other places where large quantities of the same material are sold the method is quite practical. Wherever desired, the batch may be strained or allowed to settle and a more fluid portion drawn from the top may be used as a suspending medium for a subsequent batch. In some cases it is desirable to mix foods of high and low water content in order to obtain the proper ratio of liquid to pulp and this also is within the contemplation of the invention.

From the foregoing it will be obvious that I have provided a method of food preparation and apparatus well adapted for practicing the same and while I have shown and described certain preferred embodiments of my invention I wish it understood that I am limited only in accordance with the appended claims.

Having thus described my invention, what I claim is:

1. In a device for preparing food, a receptacle having an upwardly opening, generally annular, food receiving space and a cutting element mounted for rotation in said space about a substantially vertical axis, substantially coaxial to said space, said receptacle being provided with baffles projecting into said space and cooperating with said cutting element to agitate the contents, said baffles projecting into said space inwardly from the outer receptacle wall, outwardly from the inner receptacle wall and upwardly from the bottom receptacle wall.

2. In a device for preparing food, a receptacle having an upwardly opening, generally annular, food receiving space and a cutting element mounted for rotation in said space about a substantially vertical axis, substantially coaxial to said space, said receptacle being provided with baffles projecting into said space and cooperating with said cutting element to agitate the contents, said baffles being in cross section generally triangular but with concave surfaces.

3. In a device for preparing food, a receptacle comprised of an annular bottom wall and upstanding inner and outer walls defining a food receiving space therebetween, a shaft extending upwardly within said inner wall, a cross member carried by said shaft and cutting elements depending from said cross member into said food receiving space, and means for rotating said shaft, said receptacle having integrally formed baffles on the side walls and bottom wall thereof projecting into said space and cooperating with said cutting element to agitate the contents.

4. In a device for preparing food, a receptacle comprised of an annular bottom wall and upstanding inner and outer walls defining a food receiving space therebetween, a shaft extending upwardly within said inner wall, a cross member carried by said shaft and cutting elements depending from said cross member into said food receiving space, and means for rotating said shaft, said receptacle being provided with baffles projecting into said space and cooperating with said cutting element to agitate the contents, said baffles projecting into said space inwardly from the outer receptacle wall, outwardly from the inner receptacle wall and upwardly from the bottom receptacle wall.

5. In a device for preparing food, a receptacle comprised of an annular bottom wall and upstanding inner and outer walls defining a food receiving space therebetween, said walls having baffles formed thereon, a shaft extending upwardly within said inner wall, a cross member carried by said shaft and cutting elements depending from said cross member into said food receiving space, and means for rotating said shaft, said baffles being in cross section generally triangular but with concave surfaces.

6. In a device for preparing liquid or semi-liquid foods, a receptacle comprising an annular bottom wall, upstanding inner and outer walls defining an annular food receiving space, a shaft extending upwardly through the bottom of said receptacle, a plurality of cutting and agitating elements disposed within said annular space and operatively connected with said shaft and disposed so as to rotate about an axis parallel with said shaft, and a plurality of baffles formed on said inner and outer walls and projecting into said annular space and providing restricted passageways for causing the food to pass into repeated contact with said cutting and agitating elements.

JOHN M. MARTY.